United States Patent [19]

Kurtzberg et al.

[11] Patent Number: 5,196,997
[45] Date of Patent: Mar. 23, 1993

[54] METHOD AND APPARATUS FOR QUALITY MEASURE DRIVEN PROCESS CONTROL

[75] Inventors: Jerome M. Kurtzberg; Menachem Levanoni, both of Yorktown Heights, N.Y.

[73] Assignee: International Business Machines Corporation, Armonk, N.Y.

[21] Appl. No.: 644,170

[22] Filed: Jan. 22, 1991

[51] Int. Cl.[5] .................. G06F 15/46; G01N 15/02
[52] U.S. Cl. .................. 364/152; 364/176; 364/552; 364/554; 364/468
[58] Field of Search ............ 364/148, 152, 153, 154, 364/176, 178, 179, 552, 554, 551.01, 550, 488–491, 468; 318/561, 632

[56] References Cited

U.S. PATENT DOCUMENTS

| | | | |
|---|---|---|---|
| 3,946,212 | 3/1976 | Nakao et al. | 364/552 |
| 4,257,093 | 3/1981 | Peirson et al. | 364/552 X |
| 4,320,463 | 3/1982 | Himmelstein | 364/552 |
| 4,719,586 | 1/1988 | Moyer et al. | 364/552 |
| 4,855,897 | 8/1989 | Shinskey | 364/554 X |
| 4,858,154 | 8/1989 | Anderson | 364/554 |
| 4,858,626 | 8/1989 | Neri | 131/84.4 |

FOREIGN PATENT DOCUMENTS 3218421  11/1983  Fed. Rep. of Germany.

OTHER PUBLICATIONS

"Statistical Process Control for the Chemical and Petroleum Industries", J. Shaw, Instrument and Control System, vol. 63, No. 12, Dec. 1990, pp. 23–26.
"Statistical Process Control . . . the Other Side of the Quality Coin", T. Constantinou, Instrument and Control Systems, vol. 60, No. 11, Nov. 1987, pp. 45–47.
"Statistical Process Control", Motorola Bulletin BR392/D; date unknown.

Primary Examiner—Joseph Ruggiero
Attorney, Agent, or Firm—Ratner & Prestia

[57] ABSTRACT

A process controller determines the quality of a process based on input signals derived from a measured parameter value. A processor generates the input signals using a function of the parameter value which is positive over the range of the parameter, is monotonic, has a single peak at a preferred value for the parameter, and decreases strictly as the deviation from the preferred value increases. The quality function is used as an objective measure to control the process to produce an optimal product.

11 Claims, 4 Drawing Sheets

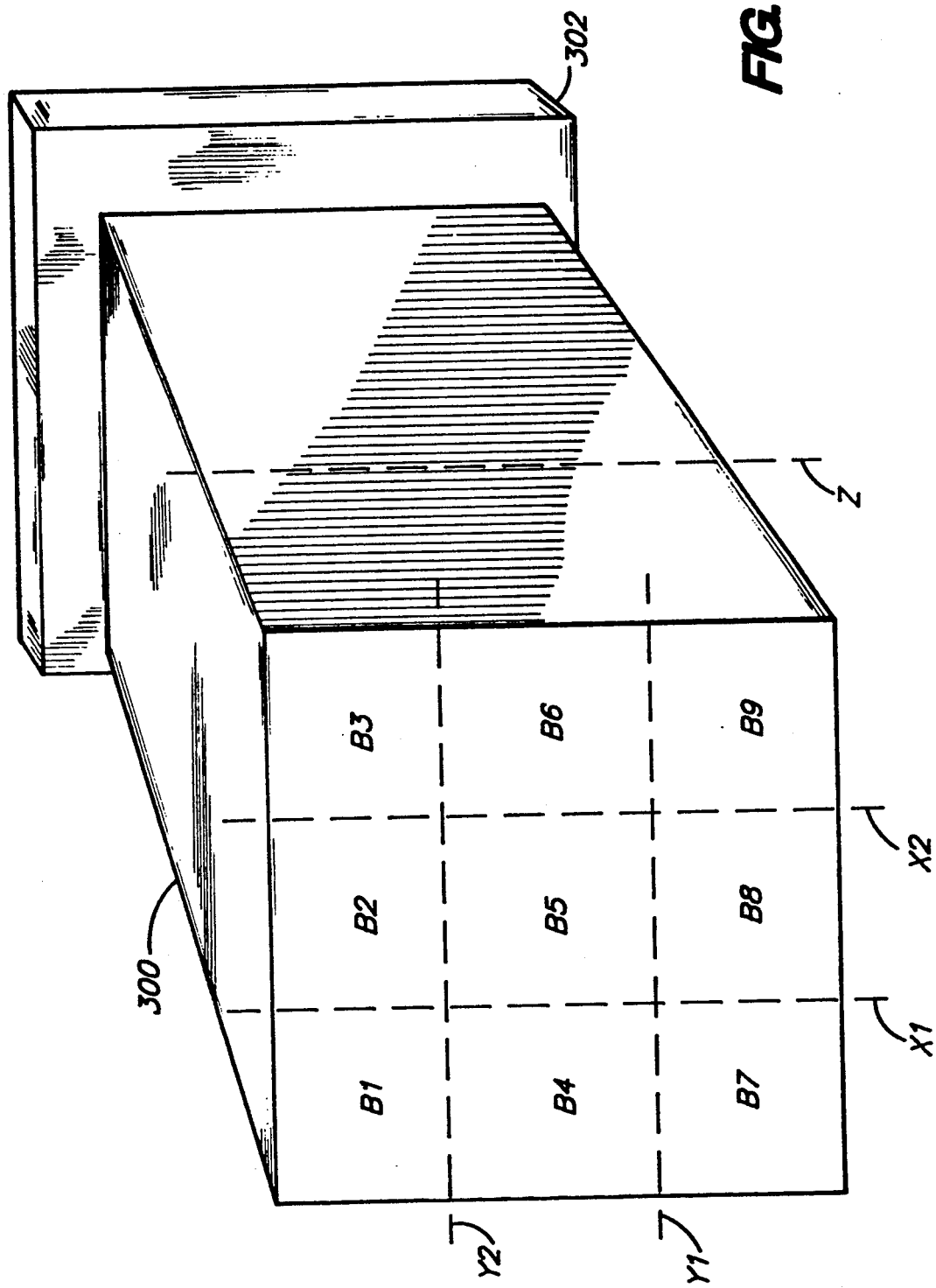

METHOD AND APPARATUS FOR QUALITY MEASURE DRIVEN PROCESS CONTROL

BACKGROUND OF THE INVENTION

The present invention is directed to manufacturing process controllers, and in particular to a method and apparatus for continually driving a manufacturing process, based on monitored parameters, to produce an optimal product.

Many manufacturing processes currently include facilities for monitoring various parameters of the process and of the product produced by the process to regulate the quality of the product. To this end, sensors have been developed which provide indications of the various parameter values during the manufacturing process. In addition, information on the process can also be obtained by examining the products after they have been processed.

For example, consider a process in which one-inch wooden blocks are cut from larger blocks of wood. Monitored parameters may include an indication of the relative positions of the saw blades; the squareness of the block; the height width and depth of the block; the smoothness of the block surfaces; and the amount of power being used by the saws that cut the blocks.

In a continuously controlled process, a parameter such as block height may be monitored to determine when the process is out of tolerance. In some process control systems, the value of a parameter is modeled as a Gaussian distribution having a predetermined mean, M, and standard deviation, $\sigma$. In one type of out-of-tolerance process control system, action to correct the process is only taken when the monitored parameters of a significant number of individual products have values that differ from the mean by more than three times the standard deviation (i.e. $\pm 3\sigma$).

This type of out-of-tolerence control system may not produce an optimal product when, for example, the degradation of a monitored process variable is gradual. In this instance, the value of the monitored variable deviates from the predetermined mean value slowly, so that a pattern of out-of-tolerance measurements may only be detected after a relatively large number of products which are out-of-tolerance have been produced. In addition, the products produced by the process, while inside the tolerance limits, may differ significantly from the desired mean parameter values. These products may be considered inferior to products which hew closely to the mean.

An exemplary out-of-tolerance control system is the C(p,k) system which is widely used in the industry. This system is described in a document by J. Hoskins et al. entitled "Statistical Process Control" Motorola Publication No. BR392/D which is hereby incorporated by reference for its teaching of the C(p,k) system. According to this system, each monitored variable of a process is modeled as a Gaussian distribution having mean and standard deviation values which define all acceptable products as being within plus and minus six standard deviations ($\pm 6\sigma$) from the mean. Each process variable is statistically monitored. If the actual frequency distribution falls outside of the $\pm 6\sigma$ limits, the C(p,k) system alerts the operator that corrective action should be taken.

Simple out-of-tolerance control systems have several problems. First, the system cannot make adjustments based on a single item since there is no measured standard deviation to compare with an ideal standard deviation. Second, these systems do not provide any useful information to center the process if the range of the process (i.e. standard deviation) is zero. In this instance, all measured parameters would have a C(p,k) value of infinity except where the measured mean is exactly at tolerance; then, C(p,k) would have the undefined value of 0/0. Third, even when the target standard deviation is non-zero, the C(p,k) system does not provide information that can be used to reduce process range if the process mean is at the tolerance limit. In this instance, the C(p,k) values are zero since the process mean is within the tolerance limit.

In an out-of-tolerance system, if all of the previously produced products are included in the sample space that defines the actual distribution of process values, a slow degradation may not be recognized until a relatively large number of out-of-tolerance products have been produced. That is to say, as the process goes out of tolerance, the number of products which do not meet the tolerance criteria may be statistically insignificant relative to the total number of products that have been produced. In addition, rather than conforming to a Gaussian distribution having a predetermined mean and standard deviation, the parameter values of the actual products may have a mean value or a standard deviation that differs significantly from the target value.

Another problem that may be encountered when a out-of-tolerance control system is used, occurs when the target distribution for acceptable products is not symmetric. This may occur, for example, in a process which manufactures semiconductor resistors. Because resistivity is measured as ohms/square, the resistance is a function of the relative proportions of the resistor. Thus, if the width of a mask opening which defines a resistor may vary by $\pm 50\%$, the impedance of the resistor may vary by $-33\%$ to $+100\%$. In this instance, using a symmetric tolerance limit may result in control operations which are too stringent for resistors having increased impedance or too lax for resistors having decreased impedance.

U.S. Pat. No. 4,320,463 PRODUCTION CONTROL SYSTEM addressed these problems by defining the sample space as a moving window of parameter values. Since the number of samples in the sample space is reduced, a smaller number of out-of-tolerance samples is recognized as being statistically significant.

U.S. Pat. No. 4,855,897 METHOD AND APPARATUS FOR STATISTICAL SET POINT BIAS CONTROL describes a method by which sample values in the sample space are weighted by an exponential function of their age to reduce the significance of older samples on the calculated actual distribution of sample values. This patent also describes a method by which the controller is biased to respond more quickly to deviations on one side of the mean value than deviations on the other side of the mean value.

SUMMARY OF THE INVENTION

The present invention is embodied in a process control system which measures the quality of a at least one process parameter, which may be, for example, some physical characteristic of the product. In addition, the system is able to control the production apparatus to change the characteristics of the measured product and so change the value of the measured process parameter. The first step in the process control method is to measure the value of the parameter. The control system then develops an indication of the quality of the measured parameter using a continuous function of the parameter value that has a peak at an optimal value for the parameter and decreases in value monotonically as the deviation from the optimal value increases. In the process controller, this function is used as an objective function to determine how the process input value is to be changed to drive the process to hold the parameter close to its optimal value.

According to a further aspect of the invention, the continuous monotonic function of the monitored parameter, the function, Q, is a modified Gaussian distribution given by equation (1)

$$Q = \frac{1}{(1 + 2ks^2)^{\frac{1}{2}}} e^{-k\frac{m^2}{1+2ks^2}} \quad (1)$$

Where m is the deviation of the measured parameter from the target mean value M, s is the process standard deviation in tolerance units (i.e. a tolerance of $3\sigma$ corresponds to a value of $\frac{1}{3}$ for s), and k is an independent parameter which may be changed to adjust the sensitivity of the process to the tolerance limits.

According to another aspect of the invention, the continuous monotonic function of the monitored parameter is non-symmetric and monotonically strictly decreasing with deviation from the peak.

According to yet another aspect of the invention, the process controller provides control values which are used to drive the process to correct deviations in the monitored parameters according to a control algorithm. The controller conforms the desired control values, produced by the control algorithm, to limit values defined for the process control mechanism.

BRIEF DESCRIPTION OF THE DRAWINGS

FIG. 3 is a perspective drawing of an exemplary process for manufacturing wooden blocks which is useful for explaining the operation of an embodiment of the invention.

DETAILED DESCRIPTION

Overview

The present invention is a method of controlling an industrial process which uses a measure of quality hereinafter referred to as the Q factor. Multiple Q factors may be individually defined for several parameters of each item produced by the process or a single Q factor may be defined for a composite of the several parameters.

In addition to the Q factors, the process has one or more defined driving functions. These functions may be used to determine how inputs to the process may be changed to change the characteristics of the products produced by the process. This in turn changes the values of the parameters and thus, the value of the Q factor(s) for the process.

Figure 1:
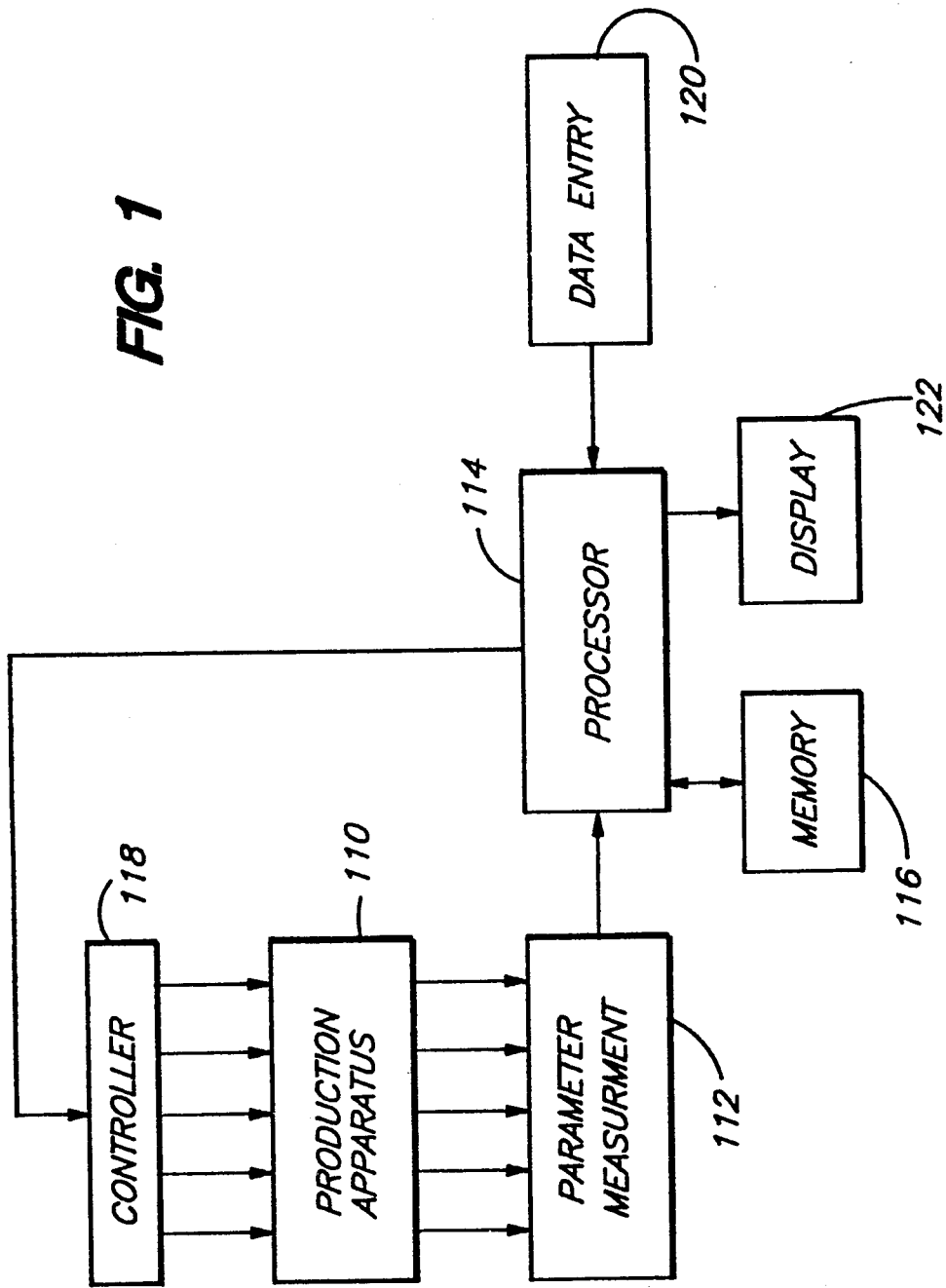
FIG. 1 is a block diagram of a process controller which includes an embodiment of the present invention

With reference to FIG. 1, production apparatus 110, which performs a process, is controlled by a data processor 114 through a controller 118. The data processor 114 is programmed with a set of control functions that describe how the controller 118 may drive the production apparatus 110 to change the characteristics of the products. Also coupled to the production apparatus 110 are parameter measurement sensors 112. These sensors determine the values of the process parameters to be measured either during processing or after the product has been processed.

The processor 114 is also programmed with a set of Q factor equations which allow it to determine the quality of the product based on the values of the monitored parameters. A second set of equations links the Q factor equations to the driving functions that are implemented in the controller 118. These equations describe how the driving factors affect the measured parameters. When the processor 114 detects that one or more of the Q factors is not at its optimal value, it uses these equations to determine which driving functions should be modified and by how much to steer the process to produce an optimal product.

DETAILED DESCRIPTION OF THE EXEMPLARY EMBODIMENTS

In the exemplary embodiments of the invention, the function described by equation (1) is selected as the Q factor.

$$Q = \frac{1}{(1 + 2ks^2)^{\frac{1}{2}}} e^{-k\frac{m^2}{1+2ks^2}} \quad (1)$$

In this equation, m is the difference between the measured parameter value and the target mean value M, s is the process standard deviation in tolerance units and k is a value that is selected to control the sensitivity of the Q factor to the process limits. The equation (1) is in the form of a Gaussian distribution which has been modified to eliminate singularities and zero values. Thus, the equation (1) describes a function which is positive and continuous everywhere, and has a single maximum value. The maximum value is achieved when the measured parameter value is exactly at its target mean value. The value of the function at its maximum is determined by the values of s and k.

The Q factor function is integrable over a process period of interest such that the average over the items produced in a particular period can be taken to represent the Q factor of the process. Further, the Q factor of a sequence of processes can be derived from the Q factors of the individual processes. Alternatively, this Q factor may be obtained by direct measurement of the final product produced by the sequence of processes.

The Q factor is defined over an axis representing the deviation, from the target value, of the item being measured. The Q factor function is valid in both the positive and negative directions and does not need to be symmetric.

The Q factor achieves its maximum value if and only if the process parameter being measured is exactly at its target value, that is to say if the items produced exactly meet the target specifications as defined by the mean and standard deviation of the Gaussian distribution that underlies the Q factor equation. If the Q factor has a parametric value of ε (some defined small value), then the process is at the edges of the window that defines an acceptable product.

A process controller uses the Q factor as follows. When the process is being set up, the engineer selects one or more process parameters to be monitored. The engineer then determines a set of driving functions which may indicate how the values of the selected parameters may be modified. Each of the selected parameters may be driven by one or more input signals applied to the process controller 118. In the example of the manufacturing process that produces one-inch wooden blocks, parameters may include the squareness of the block; the height width and depth of the block; the smoothness of the block surfaces; and the amount of power being used by the saws that cut the blocks.

The driving functions for these parameters may involve: blade position for movable blades that determine block height and block width, respectively; the timing of the mechanism that pushes feed stock into the process apparatus; and blade angle for any of the saws.

The control method described below operates well when the process may be driven by applying appropriate input values to predictably change the values of the measured parameters. Process parameters such as yield may be difficult to use unless a variation in yield can be causally associated with a particular variation of process input values.

To develop a process control algorithm, the process engineer generates two sets of equations. One set describes the monitored parameters in terms of Q factors and the other set describes how the monitored parameters may be modified to increase the value of the Q factor. The process engineer should also define a set of driving functions which describe how process input variables affect the monitored parameters. To develop these equations and functions, the control engineer should, desirably have detailed knowledge of the process including realistic desired mean values and standard deviations for each of the monitored parameters, the sensitivity of each parameter to each of the process input variables, the limitations on the process input variables, and the possible effect, on the monitored parameters, of process variables which cannot be changed by the process controller.

Figure 2:
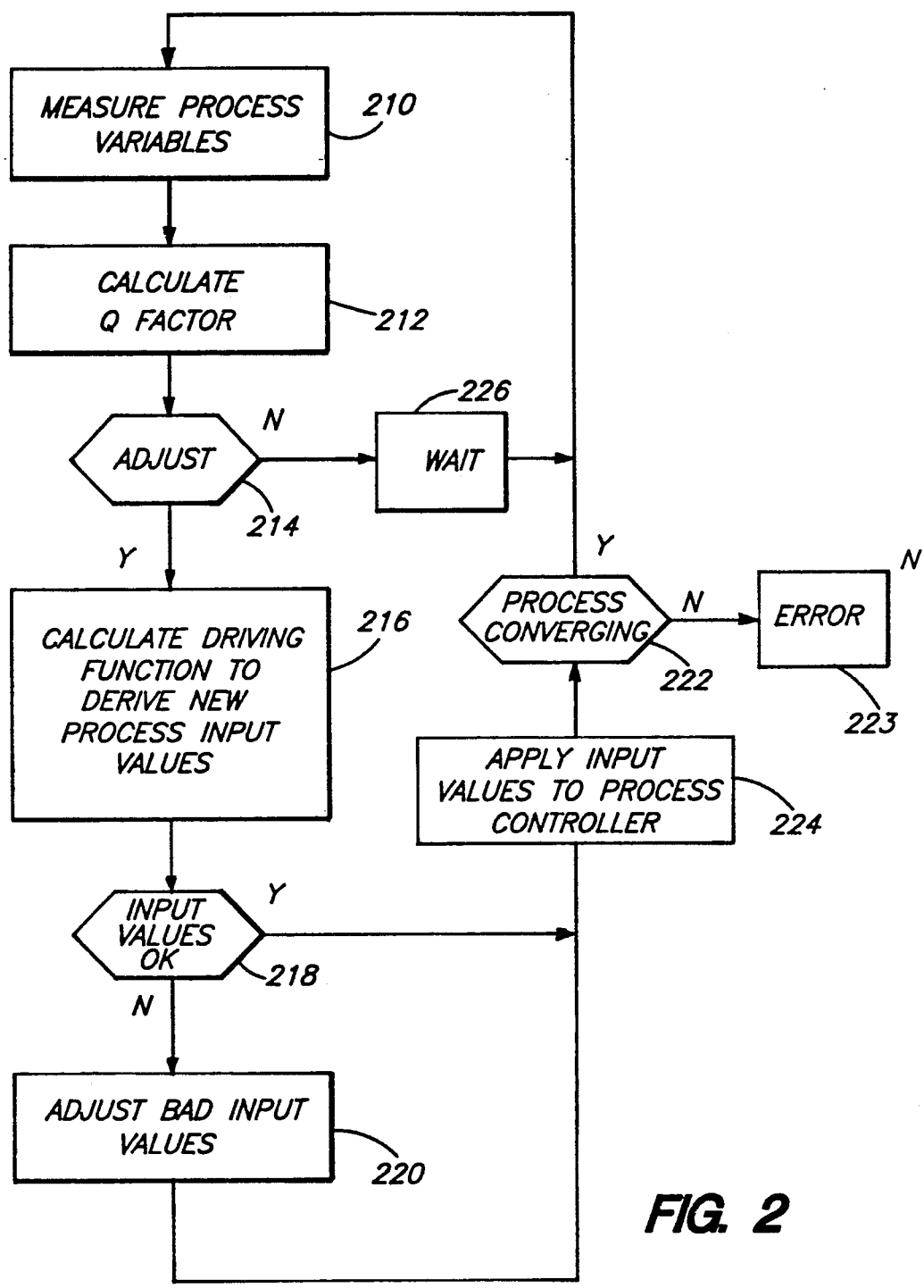
FIG. 2 is a flow-chart diagram which is useful to describe the operation of the controller shown in FIG. 1.

The processor 114 is then programmed with a control algorithm, such as is illustrated in FIG. 2. This exemplary algorithm optimizes the process using non-linear programming techniques. These techniques are described in chapter 14 of a book by H. M. Wagner entitled *Principles of Operations Research With Applications to Managerial Decisions* Prentice Hall, 1969, pp 513–575 which is hereby incorporated by reference for its teachings on optimization with a non-linear objective function.

In the first step, 210, in the algorithm shown in FIG. 2 the processor 114 conditions the parameter measurement apparatus to provide the values of the measured parameters. Step 212 then calculates the Q factor for the measured values. As set forth above, the calculated Q factor may be integrated over a number of process variable measurements which define a measurement window. Next, at step 214, the processor 114 determines, from the values of the Q factors, whether it is desirable to adjust the process. If not, step 226 is executed in which the processor 114 waits until it is time to again measure the parameters before branching to step 210, described above.

At step 214, the processor 114 determines if the parameters need to be adjusted (i.e. if the Q factor values are not at or near their optimal values). If so, step 216 is executed which uses the driving functions to calculate new values for the process input values. The process by which new input values are derived is described in more detail below.

At step 218, the algorithm determines if the calculated input values are acceptable for the process. This step ensures that the input values do not exceed the limits of the process controller either in value or in rate of change. If step 218 determines that the values are improper, step 220 is executed which adjusts the input values that have exceeded their limits to be equal to the limiting values. At step 224, the input values are applied to the process controller 118.

After step 224, step 222 is executed to determine if the process is converging, diverging or in an oscillatory mode. If the process is not converging, step 223 is executed which reports an error to the operator via the display terminal 122. If, however, the process is found to be converging, step 222 transfers control to step 226 to wait until the next time to measure the process variables.

As described above, the Q factor may be used to optimize the performance of a process. Several different optimization techniques may be used, including non-linear programming and modified linear programming.

Using the non-linear programming techniques, the Q factor of one or more monitored parameters is defined as an objective function and the equations which determine how the monitored parameters should be changed to optimize the objective function are the partial derivatives of the objective function with respect to each of the monitored parameters. The driving functions are empirically or analytically derived equations which describe how the parameter values may be adjusted by supplying appropriate process input values. Each time that the Q factor is calculated, the step 218 calculates the respective values of the driving functions. Based on these values, the processor 114 calculates new values for the process input values applied to the controller 118. These values are selected to increase the value of the objective function.

The process outlined above may employ a modified Newton method to optimize the value of the Q factor. An exemplary program which implements this algorithm is the subroutine E04KDF available as a part of the NAG FORTRAN Library from the Numerical Algorithms Group, Inc., 1101 31st Street, Suite 100, Downers Grove, Illinois 60515-1263. This program will find the minimum value of a function with respect to multiple variable parameters when supplied with the function and its partial first derivatives with respect to the multiple parameters. Using this program the negative of the Q factor would be optimized so that the minimum value of optimized function would correspond to the maximum value of the Q factor set forth in equation (1).

If the Q factor parameters are averaged over several produced objects or if the process input values are limited to a relatively slow rate of change, this optimization technique can track relatively slow changes in the process while ignoring transient variations in the monitored parameters.

An exemplary modified linear programming technique which may be used to optimize the process is the modified simplex method. By this method, the Q factor of equation (1) is not used directly as the objective function. Instead, the partial derivative of the Q factor is calculated for each process input variable at a particular point on the multidimensional surface defined by the Q factor equation. This point desirably represents the current operating point of the process. These values are then combined as coefficients of the respective process input variables to define a linear objective function.

In addition to this linear objective function, the simplex method uses a set of equations which define restrictions on the various process input variables. These equations may be, for example, conditions that define limits on how the process may be adjusted. Once these equations have been established, the simplex method is used to obtain the "optimum" values for the process input variables. This process may be repeated, using the new "optimum" position as a point on the Q factor surface to define a new linear objective function.

This method may operate well to hold a process at its optimum performance since the linear approximation near the optimum operating point may be quite good. This method has advantages over the non-linear programming method because the calculation of new process input values (step 216 of FIG. 2) and the adjustment of bad input values (step 220) are combined with the step that evaluates the objective function. This method has disadvantages compared to the non-linear programming method, however, if the process is allowed to stray very far from its optimum operating point. In this instance, the modified linear programming method may be less efficient than the non-linear programming method for reestablishing the process at its optimum operating point.

The general algorithm described above is illustrated below in the context of two examples: a process for making wooden blocks and a process for making diffused resistors on a semiconductor substrate.

The first exemplary process is illustrated by FIG. 3. A wooden block having a face which is three inches on each side is cut into multiple one-inch cubes. The process operates as follows. the large block is pushed through the apparatus by a pusher 302. It first encounters two vertically oriented saws, X1 and X2. These saws cut the block as shown by the broken lines X1 and X2 in FIG. 3. Next, the block is cut by two horizontally oriented saws, Y1 and Y2. These saws cut the block as shown by the broken lines Y1 and Y2. After the block has been pushed through the saws a sufficient distance, the pusher 302 stops while a saw Z cuts nine one-inch cubes from the front of the block. When the nine cubes have been cut and the saw Z has returned to its rest position, the pusher again pushes the block through the saws X1, X2, Y1 and Y2.

The position of the saws X1, X2, Y1 and Y2 are all adjustable as is the amount by which the block is pushed before the saw Z cuts the cubes from its face. The exemplary process is subject to vibration which increases with the speed that the block is pushed through the apparatus. The vibration causes the blades to become misaligned causing the cubes produced by the process to be off in at least one of their dimensions. If, however, the apparatus is run at a slow speed to minimize vibration, its yield is low.

Thus, the object is to operate the process at the highest speed which produces an acceptable yield. In addition, yield can be improved by dynamically adjusting the position of the saw blades to compensate for any displacement caused by vibration. Adjustments to the saw blades are limited, however, since the blades can only be adjusted between processing large blocks.

The monitored variables for this process are the height, width and depth of four of the cubes, B2, B4, B6 and B8. In the exemplary embodiment of the invention, these twelve variables are assigned three Q factors. In the first Q factor, the variable x is a vector $x_h$ this vector is the amount by which the height of each of the blocks differs from the desired mean of one-inch. Similarly, a second and third Q factors are based on respective vector variable $x_w$ and $x_d$, the amount by which the width and depth of each of the blocks differs from the target mean value of one-inch.

To allow for normal variations in the process, the Q factors used to update the position of the saws or the process speed are averaged Q factors which are calculated for all of the respective cubes produced by one large block and the blades are only adjusted between blocks. Thus, the height, width and depth of several blocks are averaged to produce each of the quantities $Q(x_h)$, $Q(x_w)$ and $Q(x_d)$.

As set forth above, using the non-linear programming technique, the driving functions are generated by taking the first partial derivatives of the relevant Q function with respect to each of the vector components.

The driving functions for the saws X1 and X2, for example would be determined by the partial derivatives of $Q(x_w)$ with respect to the measured widths of the cubes B2, B4, B6 and B8. These equations do not treat the widths of the various cubes as being independent. For example, if cubes B2 and B8 are narrower than they should be, block B4 is about the right size and block B6 is wider than it should be, the driving function would indicate that B2 and B8 should be made larger while B6 is made smaller. This can be accomplished, for example, by moving saw X2 to the right.

A simpler control scheme for the process shown in FIG. 3 determines the optimum speed of the pusher 302 as a function of the combined Q factors $Q(x_h)$, $Q(x_w)$ and $Q(x_d)$. The combination of the three Q factors may be a simple sum. Since each of the Q factors is monotonically strictly decreasing and positive everywhere, so is the sum of the three Q factors. This assumes that all of the Q factors are normalized over the same domain. An exemplary controller which uses this combined objective function may step the process from a relatively slow speed to a the lowest speed at which a degradation in the combined Q factor is noted. The optimal speed for the process may be defined either as this final determined speed or one step less than this final determined speed.

The second example illustrates how this control method may be used to control a semiconductor process. The particular process which is illustrated in the formation of a diffused resistor on a semiconductor substrate. To understand how the control method is applied to this process, it is helpful to first understand the process.

Figure 4C:
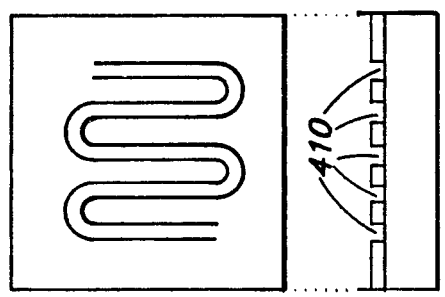
FIGS. 4a through 4d are plan views of a semiconductor manufacturing process which is useful for describing the operation of another embodiment of the invention.
Figure 4B:
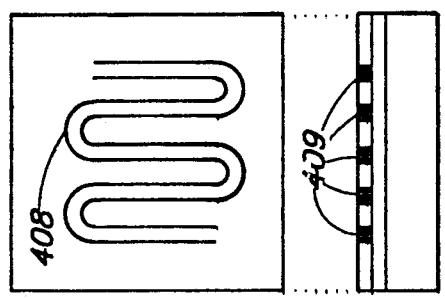
Figure 4A:
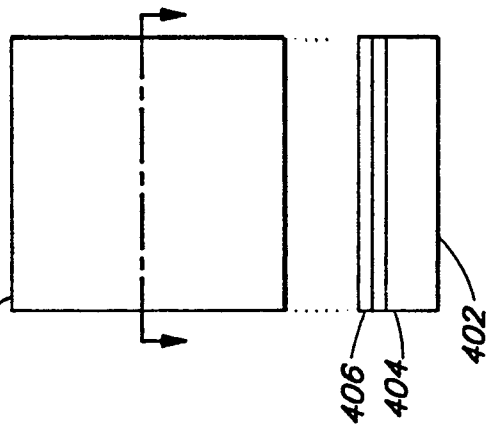

FIGS. 4a through 4d illustrate the process. Each of these figures represents a top view and a cross-sectional side view of a portion of a semiconductor wafer as indicated in phantom in FIG. 4a. In FIG. 4a an oxide layer 404 has been grown on the substrate 402 and a layer of photoresist 406 has been deposited on top of the oxide layer. In FIG. 4b, the photoresist 406 has been exposed to ultraviolet light everywhere except for a masked area 408 which defines the desired location of the resistor. In the exposed areas, the photoresist polymerizes and forms a film that is resistant to an etching agent. When the etching agent is applied, it removes the photoresist and the underlying oxide layer in the unexposed areas.

The result of the etching operation is shown in FIG. 4c with the polymerized photoresist removed. An opening 410 exists through the oxide layer 404 to the semiconductor substrate 402 in the pattern defined by the resistor mask. The next step in the process, is to diffuse impurities into the semiconductor substrate through the opening 410 to define a channel for the resistor. The result of this process step is shown in FIG. 4d.

Figure 4D:
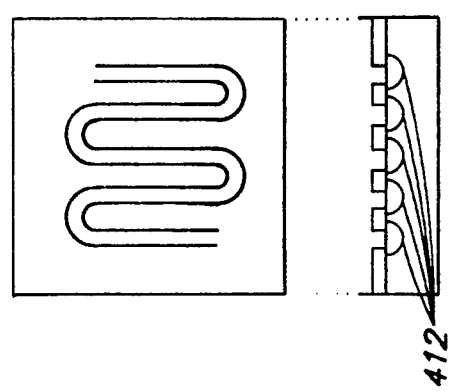

The diffused areas 412, shown in FIG. 4d, define a channel that may be used as a resistor in a silicon integrated circuit. It is well known that the resistivity of a doped silicon substrate is measured in ohms per square and depends on the concentration of impurities. The impedance of the resistor shown in FIG. 4d is a function of the resistivity of the doped silicon and the number of squares that can be lined up end-to-end in the channel 412.

The length of the channel 412 is substantially independent of how the process is performed. The width of the channel and so, the resistance of the resistor, however, may vary over a relatively wide range due to slight variations in the process steps.

If, for example, the ultraviolet light source is too bright, light may be diffracted or scattered around the edge of the mask, causing some of the photoresist under the mask to be exposed. Since this photoresist would not be removed in the etching step, the width of the channel 412 would be decreased. Conversely, if the light is too dim or if the photoresist is not exposed for a sufficient amount of time, the photoresist just outside of the mask pattern may not be polymerized, causing the channel to be wider that expected.

A variation in the time interval in which the wafer is etched may also vary the width of the channel. If, for example, the wafer is etched for too long a time period, the etchant may act laterally, undermining the exposed mask area. This would undesirably increase the width of the resistor channel.

The width of the channel may also be affected by the diffusion step. In a typical diffusion, an impurity is vapor-deposited onto exposed surfaces of the wafer and the wafer is then held at a relatively high temperature to allow the impurities to diffuse into the bulk silicon. In addition to diffusing down into the silicon, the impurities also diffuse horizontally beneath the oxide layer. This horizontal diffusion decreases the resistance of the semiconductor by a factor proportional to the width of the channel. At the same time, however, the lower impurity concentration of the channel, also resulting from the increased diffusion time, increases the resistivity of the semiconductor by a factor proportional to the cross-sectional area of the channel.

Since the impedance of the resistor is measured in ohms per square, variations in this impedance caused by variations in the width of the channel are not symmetric. If, for example, the width of the channel may vary by ±50%, the resistance of the resistor may vary from −33% to +100%.

The first step in applying the Q factor control method to a process is to identify the process parameter which is to be measured. For this process, the monitored parameter is the resistance of the resistor. The driving functions involve the process input values which affect the resistance. As set forth above, these may be the brightness of the lamp, the duration with which the mask is exposed, the amount of time that the wafer is etched, and the amount of time that the impurity is allowed to diffuse.

As set forth above, most of these values affect the resistance by affecting the width of the channel. Since variations in width result in a non-symmetric change in resistance, it is desirable to define separate positive and negative Q factor equations for this process. Both of these equations have the form of the equation (1) set forth above the only difference is in the value of the variable s. It may be desirable, for example, to hold the process to a tolerance of $3\sigma$ in the positive direction (i.e. for resistance values greater than the nominal) but to only $\sigma$ in the negative direction. Thus, the value of s for the positive Q factor equation is $\frac{1}{3}$ while the value of s for the negative equation is 1.

The value m in each of the Q factor equations is the measured resistance Rm minus the target resistance Rt. In the exemplary embodiment of the invention, the target resistance is a number. It is contemplated, however, that this resistance value may be a function of process variables which cannot be controlled by the process control mechanism. In this way, the effect of these variables may be at least partially canceled in the Q factor equation.

In the exemplary embodiment of the invention, the measured resistance of the resistor would be given by the equation (2).

$$Rm = L/(WqN\mu) \qquad (2)$$

In this equation, L and W are respectively the length and width of the channel that defines the resistor, q is the charge of an electron, n is the net impurity concentration in atoms/cm$^3$ and $\mu$ is the mobility of the doped semiconductor which is also a function of the concentration of impurities. As set forth above, W may be a function of the type of photoresist that is used, the power of the light source used to illuminate the wafer, the amount of time that the light source is operated, the type of etchant used and the amount of time that the wafer is etched. Equations which describe these functions may be determined analytically or empirically. Once the equations have been determined, they may be substituted into equation (2) which, in turn, may be substituted into equation (1). The next step would be to generate equations which describe the partial derivatives of the Q factor equations with respect to each of the process input variables.

If the non-linear programming process control method is used, the combined Q factor equation and the partial derivative equations may be provided to a modified Newton method program such as the one referenced above. This program may then be used as step 216 of the control method described above in reference to FIG. 2.

If the linear programming process control method is used, the partial derivatives of the combined Q factor equation are used to specify a linear objective function which is accurate close to the target parameter values. This function is then combined with functions that describe limiting values for the various input variables. These equations are suitable for a linear programming optimization technique such as the well known simplex algorithm.

While the invention has been described in terms of exemplary embodiments, it is contemplated that it may be practiced with variations within the spirit and scope of the appended claims.

The invention claimed is:

1. A method of controlling a process which produces a product in a system which includes production apparatus, means for measuring a parameter of one of the process and the product, the parameter having a preferred value and a predetermined range of possible values, and adjustment means for changing the manner in which the product is processed to change the value of the parameter, said method comprising the steps of:
   a) measuring said parameter value using the measuring means;
   b) calculating a measure of the quality of the measured parameter value by substituting said measured parameter value into a function of said parameter value which is continuous and monotonically strictly decreasing over said predetermined range of possible values and has one maximum value corresponding to the preferred value for the parameter;
   c) comparing the calculated measure of quality to the maximum measure of quality;
   d) applying an input signal to said adjusting means in response to a difference between the calculated measure of quality and the maximum measure of quality;
   e) adjusting said production apparatus using the adjusting means, to change the parameter value so as to increase the measure of quality;
   f) producing said product by said adjusted production apparatus; and
   g) repeating steps (a) through (f) until said difference does not exceed a predetermined value.

2. The method of claim 1 wherein:
   the process produces a plurality of products;
   the means for measuring includes apparatus for measuring a physical characteristic of the product;
   step a) includes the step of measuring the physical characteristic of said plurality of products; and
   step b) includes the steps of calculating, from said measured physical characteristic, a preliminary measure of quality for each of said plurality of products and averaging said plurality of preliminary measures of quality to develop said measure of quality.

3. The method of claim 2 wherein the function of the parameter value is a real value Q represented by the equation:

$$Q = \frac{1}{(1 + 2ks^2)^{\frac{1}{2}}} e^{-k\frac{m^2}{1+2ks^2}}$$

where m is the difference between the measured value of the parameter and the preferred value of the parameter, s is a measure of allowable variability of the parameter and k is a real value which controls process sensitivity to the variability of the parameter.

4. The method of claim 3 wherein the allowable variability of the parameter for values less than the preferred value is different than the allowable variability of the parameter for values greater than the preferred value and the function Q is defined by a first equation:

$$Q_G = \frac{1}{(1 + 2ks^2)^{\frac{1}{2}}} e^{-k\frac{m^2}{1+2ks^2}}$$

for parameter values greater than the preferred value and by a second equation:

$$Q_L = \frac{1}{(1 + 2ks'^2)^{\frac{1}{2}}} e^{-k\frac{m^2}{1+2ks'^2}}$$

for parameter values less than the preferred value where s' differs from s in inverse proportion to the allowable difference in variability.

5. The method of claim 1 wherein the means for changing the manner in which the product is processed is responsive to a process input value to which said parameter is causally related, wherein:
   step c) includes the step of calculating a second function of said parameter, said second function providing an indication of an amount of change in said measure of quality which may be caused by an incremental variation in said measured parameter value; and
   step d) includes the steps of determining, from the calculated second function value, a desired change in said measured parameter value and determining from said casual relationship, a change in said process input value which will cause the desired change in the measured parameter value.

6. In a production system including apparatus which implements a process that transforms supplied material into an output product, a process controller comprising:
   means for measuring at least one physical characteristic of the output product, said physical characteristic having a predetermined preferred value and a predetermined range of possible values;
   means for calculating, a measure of the quality of the output product by computing a function of the physical characteristic using the measured value of the physical characteristic, wherein said function is monotonic and positive over the predetermined range of values, has a maximum value corresponding to the preferred value of said physical characteristic and strictly decreases with deviation from the preferred value;
   means, coupled to said production apparatus and responsive to an input signal derived from the calculated measure of quality, for functionally modifying the production apparatus to change the measured physical characteristic of the output product in a sense which increases the value of the calculated measure of quality, wherein said functional modification is repeated each time said process is performed, while a difference value measured between said calculated measure of quality and said maximum value is greater than a predetermined value; and
   means, coupled to said modifying means and responsive to said functional modification, for causing said modified production apparatus to produce said output product.

7. The process controller of claim 6 wherein:
   said production apparatus produces a plurality of output products;

said means for measuring measures the physical characteristic for each of the plurality of output products;

said means for calculating calculates an average measure of quality by averaging respective values of the function at data points corresponding to each of the measured physical characteristic values; and said means for modifying the production apparatus is responsive to said averaged measure of quality.

8. In a semiconductor production apparatus including means for defining a masked area on a photoresist deposited on a semiconductor wafer and means for constructing a semiconductor device on the wafer defined by the masked area, wherein the dimensions of the masked area are variable in response to a process input value, a method of controlling the dimensions of the masked area comprising the steps of:

a) measuring a physical characteristic of the manufactured device which is affected by the dimensions of the masked area comprising the steps of:

b) calculating a measure of quality of the manufactured device as a monotonic function of the measured physical characteristic having a peak at a value corresponding to a preferred value of the physical characteristic and strictly decreasing with deviation from the preferred value;

c) applying an input signal to said production apparatus in response to a difference between the calculated measure of quality and the peak measure of quality;

d) conditioning said production apparatus to change the dimensions of the masked area in response to said input signal in a sense which changes the value of the measured characteristic to increase the value of the measure of quality;

e) constructing said semiconductor device using the changed masked area dimensions; and f) repeating steps (a) through (e) while said difference exceeds a predetermined value.

9. The method of claim 8 wherein the function of the measured physical characteristic value is a real valued function Q represented by the equation:

$$Q = \frac{1}{(1 + 2ks^2)^{\frac{1}{2}}} e^{-k\frac{m^2}{1+2ks^2}}$$

where m is the difference between the measured value of the physical characteristic and the preferred value of the physical characteristic, s is a measure of allowable variability of the physical characteristic and k is a real value which controls sensitivity to the variability of the physical characteristic.

10. The method of claim 9 wherein the device is a diffused resistor, the measured physical characteristic is the impedance of the resistor and the method of controlling the dimensions of the masked area includes the step of controlling a light used to expose the photoresist surrounding the masked area to produce respectively different levels of illumination.

11. A method of controlling a process in accordance with claim 1, wherein said predetermined value is selected to be approximately zero, effectively causing the production apparatus to be adjusted indefinitely.

* * * * *